United States Patent [19]

Umemoto et al.

[11] Patent Number: 5,045,745
[45] Date of Patent: Sep. 3, 1991

[54] SPINNING PIEZOELECTRIC BEAM OF A DUAL-AXIS ANGULAR RATE SENSOR AND METHOD FOR ITS ADJUSTMENT

[75] Inventors: Kaneyuki Umemoto; Toshio Tamura; Teruo Yano, all of Tokyo, Japan

[73] Assignee: Japan Aviation Electronics Industry Limited, Tokyo, Japan

[21] Appl. No.: 528,604

[22] Filed: May 25, 1990

[30] Foreign Application Priority Data

May 29, 1989 [JP] Japan .................. 1-136657

[51] Int. Cl.⁵ .......................................... H01L 41/08
[52] U.S. Cl. ................... 310/329; 310/330; 310/331; 310/332; 310/312; 73/1 D; 73/1 DV
[58] Field of Search ............ 310/329, 330–332, 310/312; 73/517 A, 517 R, 1 D, 1 DV, 504, 468

[56] References Cited

U.S. PATENT DOCUMENTS

| | | |
|---|---|---|
| 3,304,787 | 2/1967 | Chiku et al. |
| 3,659,255 | 4/1972 | Trott ........................ 73/1 DV |
| 4,407,094 | 10/1983 | Bennett et al. ............. 51/165 R |
| 4,431,935 | 2/1984 | Rider .......................... 310/331 |
| 4,445,361 | 5/1984 | Moffet et al. .............. 73/1 DV |
| 4,495,812 | 1/1985 | Gorris ......................... 73/468 |
| 4,791,815 | 12/1988 | Yamaguchi et al. ........ 73/1 D |

FOREIGN PATENT DOCUMENTS 2547458 12/1984 France ................. 29/25.35
2167562 5/1986 United Kingdom .

Primary Examiner—Mark O. Budd
Assistant Examiner—Thomas M. Dougherty
Attorney, Agent, or Firm—Pollock, Vande Sande and Priddy

[57] ABSTRACT

A method for adjusting a piezoelectric beam of a dual-axis angular rate sensor, in which the piezoelectric beam is excited in a direction at right angles to the lengthwise direction of two piezoelectric sensors and to a rotary shaft; detected voltages of the two piezoelectric sensors are measured by a signal measuring circuit; a bending portion of at least one of the two piezoelectric sensors is ground so that the levels of the two measured signals and the difference therebetween become small; the piezoelectric beam is excited again in the lengthwise direction of the piezoelectric sensors at right angles to the rotary shaft; detected voltages of the two piezoelectric sensors are measured by the signal measuring circuit; and a weight mounted on the free end of at least one of the two piezoelectric sensors is ground so that the levels of the two measured signals and the difference therebetween become small. Thus, acceleration components applied to the piezoelectric beam, in the detected voltages of the two piezoelectric sensors, have the same phase and the same amplitude. On both sides of each piezoelectric sensor there are formed electrodes which are spaced 1.5 times the thickness of the sensor from support washers.

4 Claims, 5 Drawing Sheets

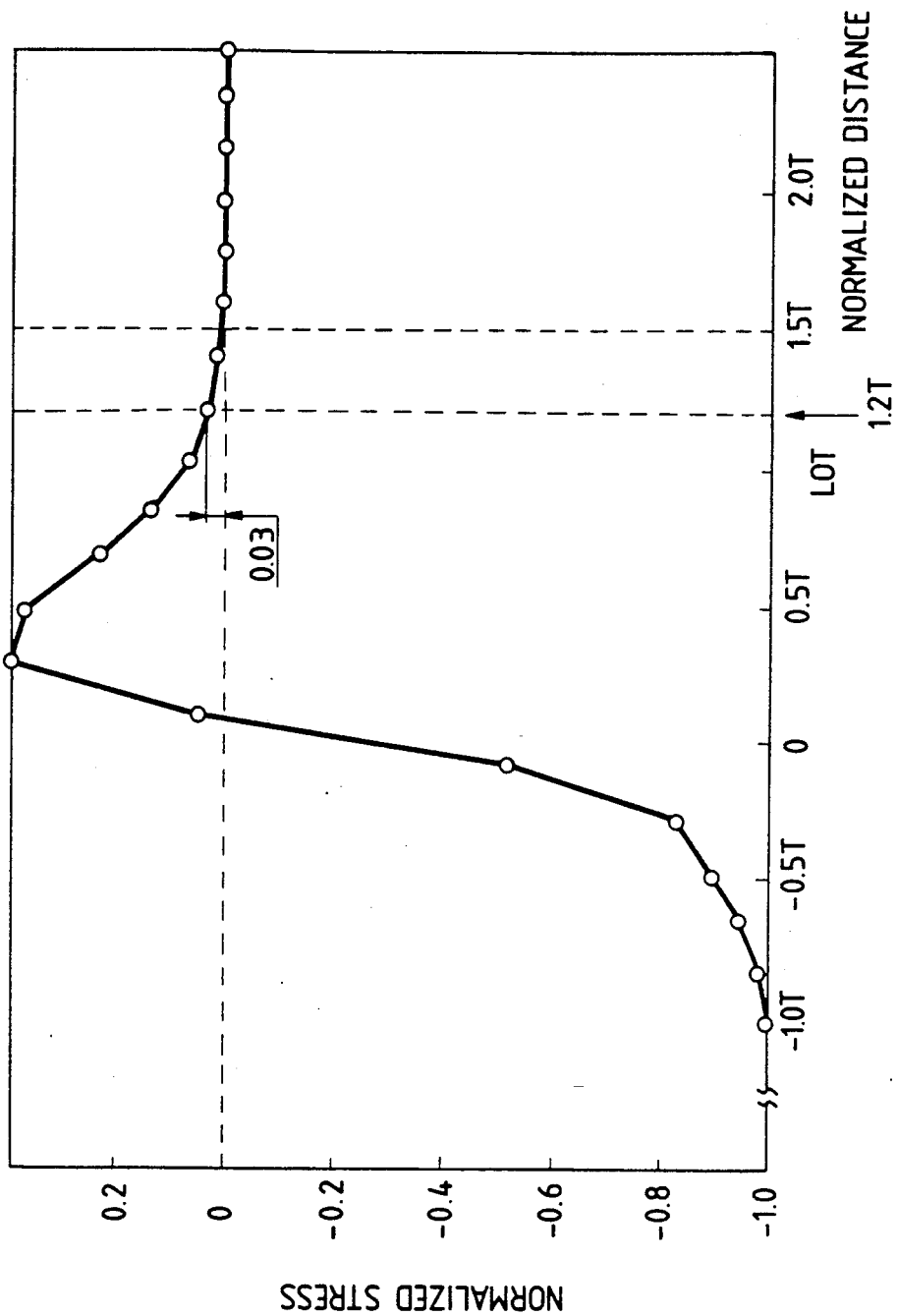

SPINNING PIEZOELECTRIC BEAM OF A DUAL-AXIS ANGULAR RATE SENSOR AND METHOD FOR ITS ADJUSTMENT

BACKGROUND OF THE INVENTION

The present invention relates to a spinning piezoelectric beam of a dual-axis angular rate sensor which is employed for attitude control of navigable vehicles such as aircraft. The invention also pertains to a method for adjusting the piezoelectric beam.

FIG. 1 illustrates a conventional spinning beam type, dual-axis angular rate sensor. The two end plates 11a and 11b of a cylindrical case 11 have mounted thereon bearings 12 and 13, respectively, and a rotary shaft 21 of a spinning piezoelectric beam 20 passes through the bearings 12 and 13 and is held therebetween in a manner to be rotatable about the Z axis. Two parallel beam-shaped piezoelectric sensors 22a and 22b are affixed, by support washers 24, to the rotary shaft 21 at right angles thereto and symmetrically with respect thereto. The piezoelectric sensors 22a and 22b are produced, for example, by forming electrodes 25a and 25b on both sides of bimorph type piezoelectric crystal beams, and they are held perpendicular to the rotary shaft 21. Mounted on both sides of the piezoelectric sensors 22a and 22b at their free end portions are weights 23a and 23b for increasing the angular rate detecting sensitivity. The piezoelectric spinning beam 20 is driven at high speed by a motor comprising a stator 14 fixed in the case 11 and a rotor 15 fixedly mounted on the rotary shaft 21. The outputs of the piezoelectric sensors 22a and 22b, provided at the electrodes 25a and 25b, are led out via leads (not shown) extending through the rotary shaft 21, slip rings 24a, 24b and 24c, brushes 16a, 16b and 16c, and preamplifiers 31a and 31b.

Now, the X and Y axes which lie in a plane containing the piezoelectric sensors 22a and 22b and perpendicular to the Z axis and perpendicularly intersect each other are defined as shown in FIG. 2A. When the case 11 of the angular rate sensor is rotated about the X axis at an angular rate $\Omega x$ (shown as a vector indicated by the arrow in the X-axis direction), Coriolis force acts on the piezoelectric sensors 22a and 22b spinning about the Z axis at an angular rate $\Omega z$, by which the piezoelectric sensors 22a and 22b bend in opposite directions at opposite sides with respect to the Y axis as depicted in FIG. 2A. As a result of this, the piezoelectric sensors 22a and 22b yield sine-wave voltage signals $x_a$ and $x_b$ which have an amplitude proposectional to the applied angular rate $\Omega x$ and are displaced 180° apart in phase as indicated by the solid line and the broken line in FIGS. 2B. Also when the case 11 of the angular rate sensor is rotated about the Y axis at an angular rate $\Omega y$, the piezoelectric sensors 22a and 22b similarly create sine-wave voltage signals $y_a$ and $y_b$ which have an amplitude proportional to the angular rate $\Omega y$ and are displaced 180° apart in phase. The signals $y_a$ and $y_b$ are phased 90° apart from the signals $x_a$ and $x_b$, respectively. On the other hand, when a vibrational acceleration $\alpha$ acts on the piezoelectric sensors 22a and 22b in the Z-axis direction, the sensors 22a and 22b vibrate in the same phase as shown in FIG. 3A, yielding voltage signals $z_a$ and $z_b$ which are of the same magnitude proportional to the acceleration $\alpha$ and of the same sign as depicted in FIG. 3B. Even if acceleration is applied in either of the X- and Y-axis directions, the piezoelectric sensors 22a and 22b will not yield voltage. Accordingly, when an angular rate vector and an acceleration vector are applied to the case of the angular rate sensor in given directions, if the difference between output voltage signals from the piezoelectric sensors 22a and 22b is produced by an electrical circuit, the signal component arising from the acceleration in the Z-axis direction is removed but a voltage signal which is the sum of vectors of an X-axis direction angular rate component $(x_a - x_b) = x$ and a Y-axis direction angular rate component $(y_a - y_b) = y$ is obtained. Since the signals x and y are phased 90° apart, the X- and Y-axis angular rate vector components x and y can be separated by synchronous detection using sine- and cosine-wave reference signals.

In practice, however, it is difficult to affix the piezoelectric sensors 22a and 22b to the rotary shaft 21 accurately at right angles thereto and in a correct attitude, because of limitations on machining and assembling accuracy of parts. Moreover, where the composite centers of gravity of the weights 23a and 23b provided at the free ends of the piezoelectric sensors 22a and 22b do not lie on the center axes thereof, acceleration perpendicular to the rotary shaft will bend the piezoelectric sensors, and if their pendulum axes are not parallel to each other, their bending differs in magnitude, introducing an error in the difference between the output signals of the two piezoelectric sensors. In the output difference signal of the piezoelectric sensors 22a and 22b an error component proportional to linear acceleration remains unremoved. To eliminate this error signal, the prior art employs an arrangement in which another piezoelectric sensor is affixed to the rotary shaft for sensing linear acceleration perpendicular thereto and its output signal is added to that of the angular rate sensing piezoelectric sensor to correct the error signal (for example, Japanese Patent Application Laid Open No. 120914/86 which corresponds to U.S. Ser. No. 672,560 filed on Nov. 19, 1984). Thus, the conventional angular rate sensor calls for the piezoelectric sensor for correction use and is adapted to permit adjustment of the angle at which the piezoelectric sensor is affixed to the rotary shaft; hence, the prior art is inevitably complex in structure.

Furthermore, in the conventional angular rate sensor the electrodes of the piezoelectric sensors 22a and 22b each extend to the ends of support washers by which the sensor is affixed to the rotary shaft, and consequently, the outputs of the sensors 22a and 22b are affected by the stresses supporting them. For example, a preload on each of the bearings 12 and 13 due to their misalignment differs with angular positions and causes a difference between the support stresses which act on the two piezoelectric sensors 22a and 22b through the rotary shaft 21, and the stress difference varies with the rotational stress. This introduces a difference between the outputs of the piezoelectric sensors 22a and 22b and the output difference varies with the rotational frequency, providing an error in the angular rate signal.

SUMMARY OF THE INVENTION

It is therefore an object of the present invention to provide a piezoelectric beam adjustment method which ensures the elimination of the acceleration signal component that introduces an error in the angular rate signal.

Another object of the present invention is to provide a spinning piezoelectric beam which is free from the influence of a change in the difference between support stresses which act on both piezoelectric sensors.

According to an aspect of the present invention, neutral axes of the two piezoelectric sensors at their respective bending portions are adjusted to be essentially parallel to a plane perpendicular to the rotary shaft, and the pendulum axes joining support points of the two piezoelectric sensors and the centers of gravity of weights at their free end portions are adjusted to be essentially parallel to the plane perpendicular to the rotary shaft. The adjustment of the neutral axes is done by grinding a proper one of four corners of each piezoelectric sensor at its bending portion in the cross-section thereof. The adjustment of the pendulum axes is made by properly grinding the pair of weights of each piezoelectric sensor.

Since the neutral axes and the pendulum axes of the both piezoelectric sensors are adjusted as mentioned above, their output signals responding to an acceleration in the direction of the rotary shaft agree with each other in their level and phase, and their output signals responding to an acceleration in an arbitrary direction perpendicular to the rotary shaft are very low in level and have the same level and phase. Accordingly, all acceleration components in the outputs of the two piezoelectric sensors can cancel each other to such an extent as to be negligibly small.

According to another aspect of the present invention, the electrode of each piezoelectric sensor is formed at such a distance from its support end that the electrode will not be affected by the stress at the sensor support portion. Consequently, the difference between the support stresses acting on the two piezoelectric sensors will not appear in their outputs.

BRIEF DESCRIPTION OF THE DRAWINGS

FIG. 7 is a graph showing the results of calculation of the stress produced in the piezoelectric sensor by its support stress.

DESCRIPTION OF THE PREFERRED EMBODIMENTS

Figure 1:
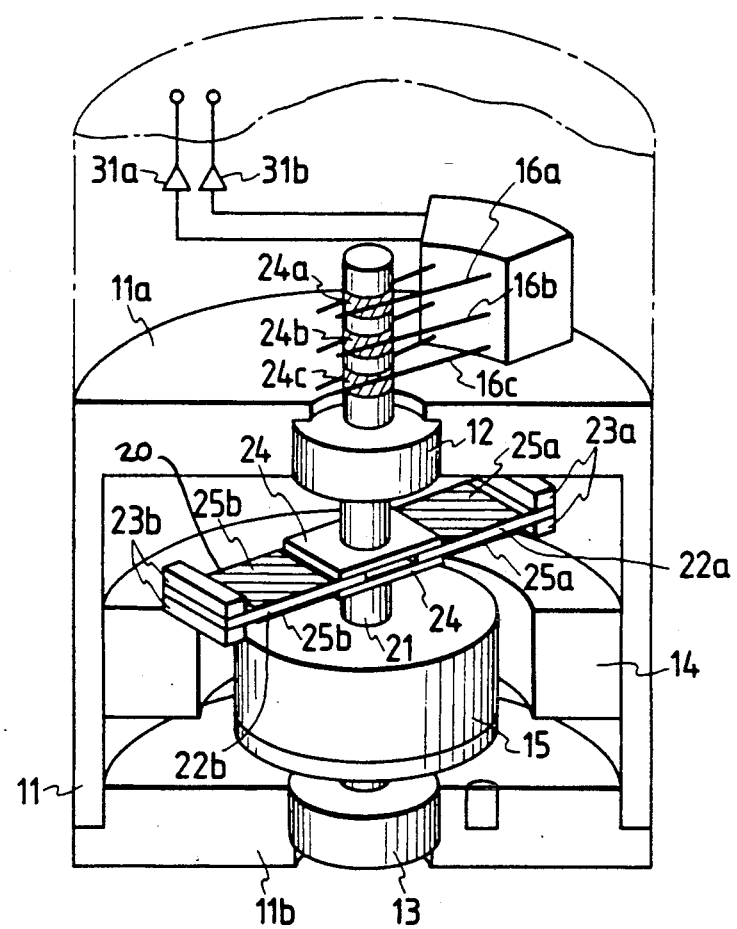
FIG. 1 is an exploded perspective view showing the internal construction of a conventional dual-axis angular rate sensor.
Figure 3B:
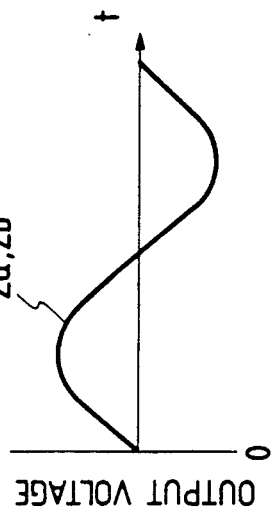
FIG. 3B shows output voltage waveforms of the two piezoelectric sensors in FIG. 3A.
Figure 2B:
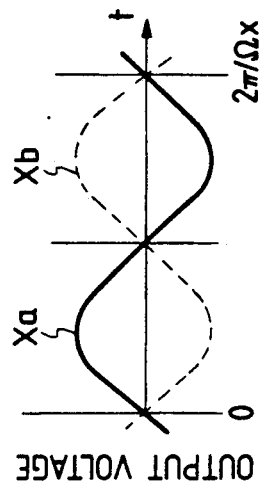
FIG. 2B shows output voltage waveforms of the two piezoelectric sensors depicted in FIG. 2A.
Figure 2A:
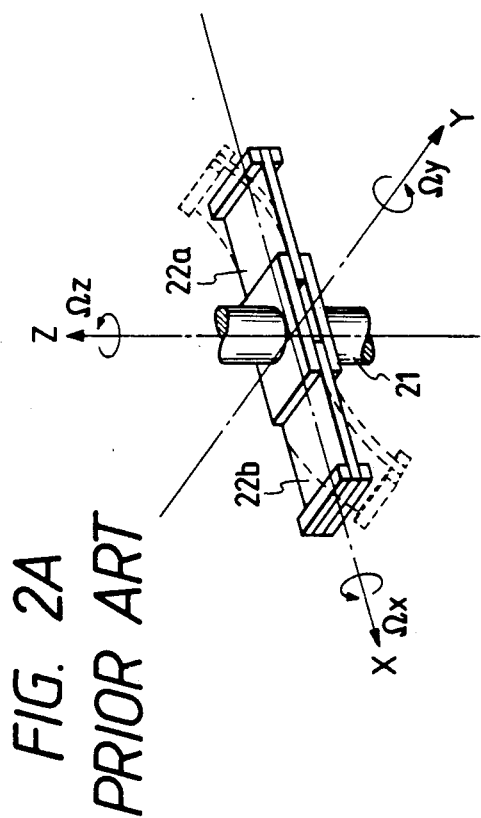
FIG. 2A is a perspective view showing bends of both piezoelectric sensors.
Figure 3A:
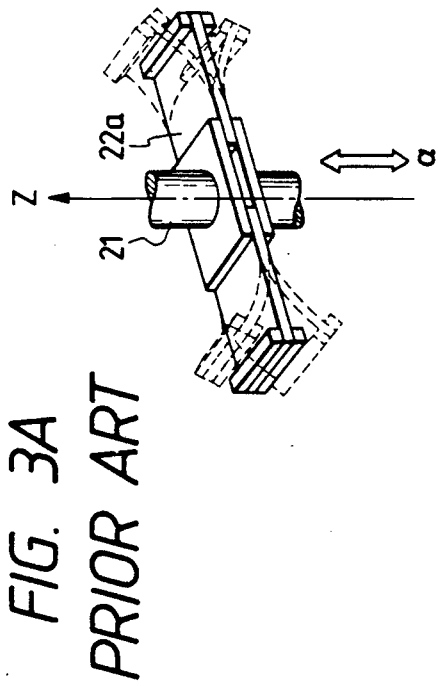
FIG. 3A is a perspective view showing bends of the both piezoelectric sensors when a vibrational acceleration is applied to the dual-axis angular rate sensor.
Figure 4:
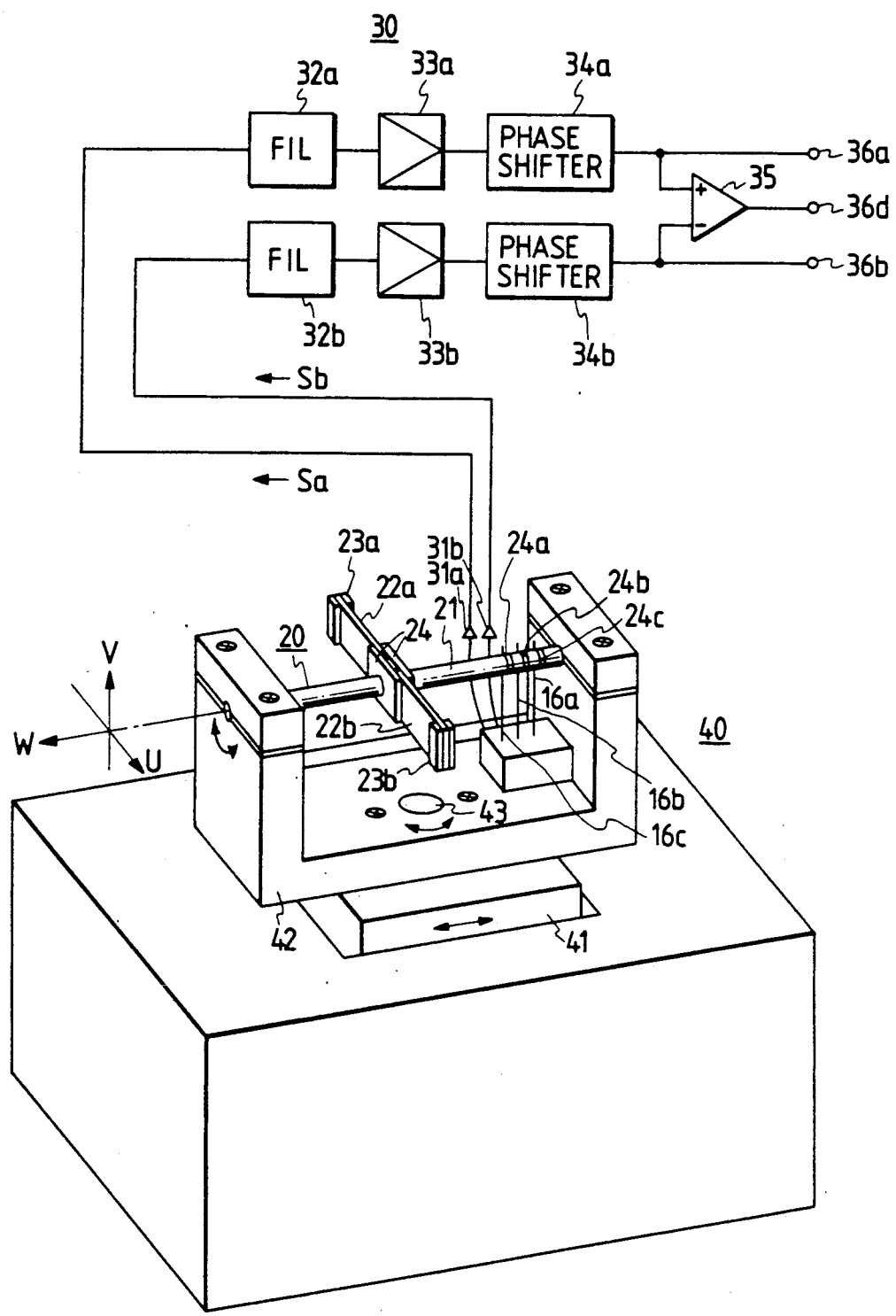
FIG. 4 is a system diagram illustrating an exciting unit 40 and a signal measuring circuit 30 for adjusting a piezoelectric beam according to the present invention.

FIG. 4 illustrates a signal measuring circuit 30 and an exciting unit 40 of a device for adjusting the piezoelectric beam according to the present invention. The exciting unit 40 has an exciting stand 41 and an attachment 42, and the exciting stand 41 can be vibrated in the Z-axis direction at a desired frequency and with a desired amplitude. The rotary shaft 21 of the piezoelectric beam 20 is fixed at both ends to the attachment 42 which is mounted on the exciting stand 41 in such a manner that it is rotatable about a shaft 43. Detected voltage signals Sa and Sb from the two piezoelectric sensors 22a and 22b are output via rings 24a, 24b, 24c and brushes 16a, 16b, 16c as in the case of the angular rate sensor shown in FIG. 1, and the output signals are applied to preamplifiers 31a and 31b provided on the attachment 42 and then input into the signal measuring circuit 30.

In the signal measuring circuit 30 the input signals Sa and Sb are provided via filters 32a and 32b to variable gain amplifiers 33a and 33b, wherein they are adjusted in amplitude, thereafter being applied to variable phase shifters 34a and 34b for their phase adjustment. The outputs of the phase shifters 34a and 34b are provided to terminals 36a and 36b, respectively, and at the same time, they are applied to a differential amplifier 35, wherein a difference between the two signals is detected and from which the difference signal is provided to an output terminal 36d. The signals thus derived at the output terminals 36a, 36b and 36d are displayed on, for instance, a CRT though not shown. A description will be given of the method for adjusting the piezoelectric beam 20.

Step 1: First, the attachment 42 is fixed after being turned so that the rotary shaft 21 of the piezoelectric beam 20 mounted on the attachment 42 is parallel to an excitation axis (W axis) as shown in FIG. 4. Then, a vibrational acceleration is applied by the exciting unit 40 in the direction of the rotary shaft 21 at a fixed frequency (200 Hz, for example) and with a fixed amplitude, the output signals Sa and Sb of both piezoelectric sensors 22a and 22b are provided to the signal measuring circuit 30, and the gain of at least one of the variable gain amplifiers 33a and 33b and the phase shift amount of at least one of the phase shifters 34a and 34b are adjusted so that the level of the difference signal provided at the output terminal 36d becomes minimum.

Step 2: Next, the attachment 42 is turned and fixed at a position where the rotary shaft 21 perpendicularly crosses the excitation axis W, and the piezoelectric sensors 22a and 22b are turned into agreement with the V axis. Then, a vibrational acceleration of a fixed frequency (200 Hz, for example) and a fixed amplitude is applied by the exciting unit 40 in a direction perpendicular to both of the rotary shaft 21 and the piezoelectric sensors 22a and 22b lengthwise thereof, and the signal levels at the terminals 36a and 36b are observed. In this instance, a proper one or ones of four corners $C_1$ to $C_4$ of bending portions Ba and Bb of the piezoelectric sensors 22a and 22b (the corners $C_1$ to $C_4$ in the bending portion Ba of the piezoelectric sensor 22a being shown on an enlarged sectional view taken on the line passing through a neutral axis Na in FIG. 6) are ground so that the signal levels at the output terminals 36a and 36b become minimum. In practice, the grinding is stopped when the signal levels at the terminals 36a and 36b become lower than a predetermined voltage $V_1$. Next, the corners $C_1$ to $C_4$ of the bending portions Ba and Bb are further ground so that the output difference signal evel at the terminal 36d becomes minimum, or in practice, lower than a predetermined voltage $V_2$. By such adjustments the neutral axes Na and Nb in the bending portions Ba and Bb are rendered parallel to the plane perpendicular to the rotary shaft 21.

Figure 5:
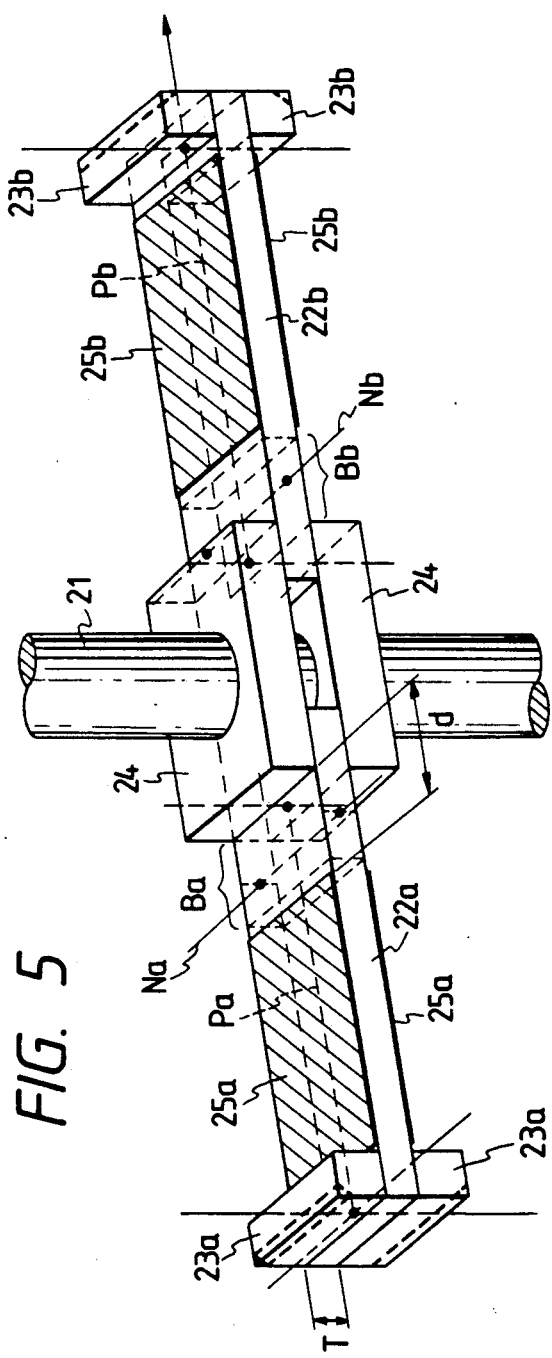
FIG. 5 is a perspective view illustrating the principal part of an embodiment of the piezoelectric beam according to the present invention.

As shown in FIG. 5, the bending portions Ba and Bb are those within predetermined ranges from marginal edges of support washers 24 in the lengthwise direction of the piezoelectric sensors 22a and 22b, and when the piezoelectric sensors 22a and 22b are bent by acceleration or Coriolis acceleration, their curvature becomes largest near the above-mentioned portions. The range of grinding in the bending portions Ba and Bb may preferably be outside electrodes 25a and 25b as described later, and more preferably, they are each selected within 1.5 times larger than the thickness T of the piezoelectric sensor from the marginal edge of the support washers 24. The neutral axes Na and Nb are straight lines joining points in the beam which are free from both tensile stress and compressive stress in the bending portions Ba and Bb when the piezoelectric sensors 22a and 22b are bent.

Figure 6:
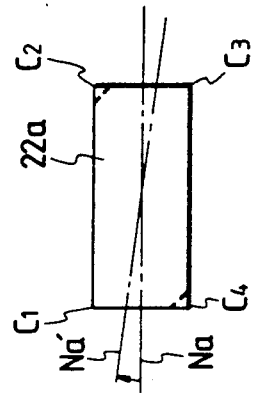
FIG. 6 is a sectional view taken on a line passing through the neutral axis of a bending portion of the piezoelectric sensor.

For instance, in the case where it is desired to slightly turn the neutral axis Na clockwise as indicated by Na' in FIG. 6, one or both of the corners $C_2$ and $C_4$ on the side opposite from the direction of rotation are ground. In the case of slightly turning the neutral axis Na counterclockwise, one or both of the corners $C_1$ and $C_3$ on the side opposite from the direction of rotation are ground. If necessary, the piezoelectric sensor 22b is similarly ground for adjustment. Alternatively, the piezoelectric sensors 22a and 22b are alternately subjected to the above-mentioned grinding. Once the neutral axes Na and Nb are thus rendered parallel to each other, the piezoelectric sensors 22a and 22b yield the same signal component in response to an acceleration applied thereto at right angles to their lengthwise direction in the plane perpendicular to the rotary shaft 21.

Step 3: The attachment 42 is fixed at the same position as in Step 2 but the rotary shaft 21 is turned 90° so that the piezoelectric sensors 22a and 22b extend along the W axis. Next, a vibrational acceleration of a fixed frequency and a fixed amplitude is applied by the exciting unit 40 along the lengthwise direction of the piezoelectric sensors 22a and 22b at right angles to the rotary shaft 21. In this instance, the weights 23a and 23b of the piezoelectric sensors 22a and 22b are ground so that the output signal levels at the terminals 36a and predetermined voltage $V_3$. Moreover, the weights 23a and 23b are ground so that the output difference signal level at the terminal 36d becomes minimum, or in practice, becomes lower than a predetermined voltage $V_4$. By adjusting the positions of the centers of gravity of the weights 23a and 23b by the above-mentioned grinding, the pendulum axes Pa and Pb joining the support points of the piezoelectric sensors 22a and 22b and the centers of gravity of the weights 23a and 23b, respectively, become parallel to the plane perpendicular to the rotary shaft 21, affording reduction of the error that is caused by the acceleration applied lengthwise of the piezoelectric sensors 22a and 22b.

The pendulum axes Pa and Pb are straight lines joining support points which are the center points of the piezoelectric sensors 22a and 22b in their cross-section at the marginal edges of the support washers 24 and the centers of gravity of the pairs of weights 23a and 23b. The above-mentioned grinding takes place on the edge of one or both of the weights 23a and 23b as shown in FIG. 5, for example. Note that only those of the pairs of weights 23a and 23b mounted on both sides of the piezoelectric sensors 22a and 22b which are opposite from the direction of shifting their centers of gravity are ground.

Where an acceleration of an arbitrary direction is applied to a dual-axis angular rate sensor employing a spinning piezoelectric beam 20 adjusted following Steps 2 and 3 mentioned above, acceleration components of signals detected by the piezoelectric sensors 22a and 22b in the direction of the rotary shaft 21 are equal to each other, and hence they can be canceled, and acceleration components perpendicular to the rotary shaft 21 are all negligibly small. Incidentally, the aforementioned voltages $V_1$ and $V_4$ are predetermined in accordance with the measurement accuracy required of the dual-axis angular rate sensor.

FIG. 5 shows the principal part of an embodiment of the spinning piezoelectric beam 20 according to the second aspect of the present invention. The electrodes 25a and 25b on both sides of each of the piezoelectric sensors 22a and 22b are each formed at a distance from the piezoelectric sensor supporting end, that is, the marginal edge of the support washer 24, i.e. at a position where the electrode will not be affected by the stress at the support portion.

FIG. 7 shows calculated values of stresses produced in the piezoelectric sensor 22a at some points in its lengthwise direction in the case where one end portion of the sensor 22a was gripped by the support washers 24 with a fixed pressure. The ordinate represents the normalized internal stress in the case where a maximum compressive stress is assumed to be $-1$ and the abscissa represents the distance on the piezoelectric sensor 22a normalized by its thickness T, with the position of the marginal edge of the support washer 24 set to 0. As shown in FIG. 7, the internal stress of the piezoelectric sensor 22a is a maximum tensile stress at about 0.3 T from the marginal edge of the support plate 24, the tensile stress gradually decreases as the distance exceeds 0.3 T, and the internal stress becomes negligibly small at a distance of about 1.2 T and substantially zero at a distance of about 1.5 T. Thus, the distance d from the marginal edge of the support washer 24 to the electrode 25a is set to 1.2 T or greater, preferably, 1.5 T or greater from the viewpoint of lessening the influence of the stress. The same is true of the piezoelectric sensor 22b.

According to the piezoelectric beam 20 of the above construction, even if the difference between the support stresses which act on the both piezoelectric sensors 22a and 22b through the rotary shaft 21 varies owing to a misalignment of the spinning beam or acceleration, its influence does not ever appear in the outputs of the piezoelectric sensors 22a and 22b.

The piezoelectric beam of the present invention is applicable as well to a conventional dual-axis angular rate/accelerometer which additionally includes a dual-axis acceleration sensing function by affixing an acceleration sensing piezoelectric sensor to the rotary shaft of the spinning beam type angular rate sensor.

As described above, according to the first aspect of the present invention, since the piezoelectric beam is adjusted so that the neutral axes and the pendulum axes of the piezoelectric sensors are both parallel to the plane perpendicular to the rotary shaft, it is possible to eliminate an error component proportional to acceleration. The application of such an adjusted spinning piezoelectric beam to a dual-axis angular rate sensor precludes the necessity of using an acceleration sensing piezoelectric sensor for correcting an acceleration error, and hence permits simplification of the overall structure of the angular rate sensor. Moreover, the above-said adjustment of the piezoelectric beam enables removal of the error component resulting from acceleration, without the necessity of highly accurate machining of parts and highly accurate assembling thereof. Hence, the angular rate sensor can easily be manufactured at low cost.

According to the second aspect of the present invention, since the electrodes of each piezoelectric sensor are formed at positions where they are not affected by the sensor supporting stresses, the angular rate can accurately be detected without being affected by the difference between the supporting stresses and their variations.

It will be apparent that many modifications and variations may be effected without departing from the scope of the novel concepts of the present invention.

What is claimed is:

1. A method for adjusting a piezoelectric beam in which two beam-shaped piezoelectric sensors are affixed to a rotary shaft at right angles thereto and symmetrically with respect thereto while being gripped by support washers in parallel to each other and each of said piezoelectric sensors carries weights at its free end, said method comprising:

a first step of applying vibrational acceleration excitation to said piezoelectric beam in a direction perpendicular to said rotary shaft and to the lengthwise direction of said piezoelectric sensors, detecting output signals of said two piezoelectric sensors and measuring said signals by sue of a signal measuring circuit, and grinding a bending portion of at least one of said two piezoelectric sensors until the detected signals of said two piezoelectric sensors measured by said signal measuring circuit each becomes smaller than a predetermined first value and until the difference between said signals becomes smaller than a predetermined second value; and a second step of applying vibrational acceleration excitation to said piezoelectric beam in the lengthwise direction of said piezoelectric sensors at right angles to said rotary shaft, and grinding at least one of said weighted until the detected signals of said two piezoelectric sensors measured by said signal measuring circuit each becomes smaller than a predetermined third value and until the difference between said signals becomes smaller than a predetermined fourth value.

2. The adjusting method of claim 1 further including, prior to said first and second steps, a step of vibrating said piezoelectric beam in the direction of said rotary shaft, and adjusting the amplitude of at least one of the two signals measured by said signal measuring circuit and the phase of at least one of the two signals measured by said signal measuring circuit to thereby adjust said signal measuring circuit so that the difference between said two signals becomes minimum.

3. The adjusting method of claim 1 or 2, wherein the range of said bending portion ground in said first step is between said support washers and electrodes of the corresponding one of said two piezoelectric sensors.

4. The adjusting method of claim 3, wherein the range of a bending portion ground in said first step is a range of 1.5 times the thickness of said corresponding piezoelectric sensor from a marginal edge of each of said support washers.

* * * * *